(12) United States Patent
Modarresi

(10) Patent No.: US 10,275,628 B2
(45) Date of Patent: Apr. 30, 2019

(54) FEATURE SUMMARIZATION FILTER WITH APPLICATIONS USING DATA ANALYTICS

(71) Applicant: ADOBE SYSTEMS INCORPORATED, San Jose, CA (US)

(72) Inventor: Kourosh Modarresi, Los Altos, CA (US)

(73) Assignee: Adobe Inc., San Jose, CA (US)

(*) Notice: Subject to any disclaimer, the term of this patent is extended or adjusted under 35 U.S.C. 154(b) by 376 days.

(21) Appl. No.: 15/167,523

(22) Filed: May 27, 2016

(65) Prior Publication Data
US 2017/0344620 A1  Nov. 30, 2017

(51) Int. Cl.
*G06K 9/00* (2006.01)

(52) U.S. Cl.
CPC ..................... *G06K 9/00* (2013.01)

(58) Field of Classification Search
CPC .. G06K 9/00; G06K 9/6253; G06F 17/30011; G06F 17/30525; G06F 17/3053; G06F 17/30882; G06F 17/30539; G06F 17/30734; G06F 17/30864; G06N 7/005; G06N 99/005; G06Q 10/10
USPC .......................................................... 707/738
See application file for complete search history.

(56) References Cited

U.S. PATENT DOCUMENTS

2006/0200431 A1* 9/2006 Dwork .............. G06F 17/30539
706/12
2011/0307438 A1* 12/2011 Fernández Martínez ...................
G06N 7/005
706/52
2014/0201185 A1* 7/2014 Chang ............... G06F 17/30864
707/709
2017/0154273 A1* 6/2017 Guttmann ............ G06N 99/005

OTHER PUBLICATIONS

Donoho, David L., and Jared Tanner. "Sparse nonnegative solution of underdetermined linear equations by linear programming." Proceedings of the National Academy of Sciences of the United States of America 102.27 (2005): 9446-9451.

* cited by examiner

*Primary Examiner* — Evan Aspinwall
(74) *Attorney, Agent, or Firm* — Shook, Hardy & Bacon L.L.P.

(57) ABSTRACT

A data-analytics application may be optimized for implementation on a computing device for conserving computing or providing timely results, such as a prediction, recommendation, inference, or diagnosis about a monitored system, process, event, or a user, for example. A feature filter or classifier is generated and incorporated into or used by the application to provide the optimization. The feature filter and classifier are generated based on a set of significant features, determined using a data condensation and summarization process, from a high-dimensional set of available features characterizing the target. For example, a process that includes utilizing combined sparse principal component analysis with sparse singular value decomposition and applying k-medoids clustering may determine the significant features. Insignificant features may be filtered out or not used, as information represented by the insignificant features is expressed by the significant features.

20 Claims, 7 Drawing Sheets

FEATURE SUMMARIZATION FILTER WITH APPLICATIONS USING DATA ANALYTICS

BACKGROUND

Recent advances in computing technology including the emergence of the Internet of Things (IoT), inexpensive mobile computing, and ubiquitous sensor and monitoring technologies enable vast quantities of data to be easily and inexpensively obtained. For example, a modern automobile may have hundreds of sensors positioned throughout its chassis, continuously gathering information about various aspects of the vehicle, such as the engine, the vehicle's performance, road position, location, weather/rain, proximity to other cars, temperature, passenger location, driver alertness, etc. Similarly, smartphones can sense or otherwise monitor and gather information about dozens of features related to a user, such as location, network connectivity, physiological data about the user in some cases, device usage, which may include applications used, browsing activity, battery life, etc. Ready access to the ocean of information made available by these recent advances in technology can provide machine learning and data-analysis systems much greater insight into the monitored events, operations, or processes that produce the data.

However, in many circumstances, this large amount of data includes significant irrelevant data or "noise." As a consequence, the machine learning, predictive, and data mining technologies operating on this information often generate misleading or incorrect outcomes, rendering them less useful. Additionally, the high-dimensionality of such large amounts of information substantially increases the computational processing, storage, and communication requirements for these applications, often rendering them unsuitable for operating on many mobile devices and making providing timely results to an end-user difficult or nearly impossible.

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

Embodiments of this disclosure are generally directed to streamlining applications and services typically operating on high-dimensional data by providing a filtering mechanism for identifying and selectively using the most relevant or useful data needed for the particular application or service. This most relevant or useful data is contained in a set of significant features identified from an initial set of features from a dataset. To identify the set of significant features, embodiments operate on a data matrix containing data values for the initial set of features. Right-singular vectors are generated by applying sparse principle component analysis (PCA) to the data, including a decomposition of the data. The right-singular vectors are then grouped into clusters. For each cluster, a right-singular vector that is the medoid (center) of the cluster is determined. The significant features are then determined as the features corresponding to each of these right-singular vectors. These significant features then may be utilized by a particular data-analytics application or service.

BRIEF DESCRIPTION OF THE DRAWINGS

The present disclosure is described in detail below with reference to the attached drawing figures, wherein.

DETAILED DESCRIPTION

Figure 1:
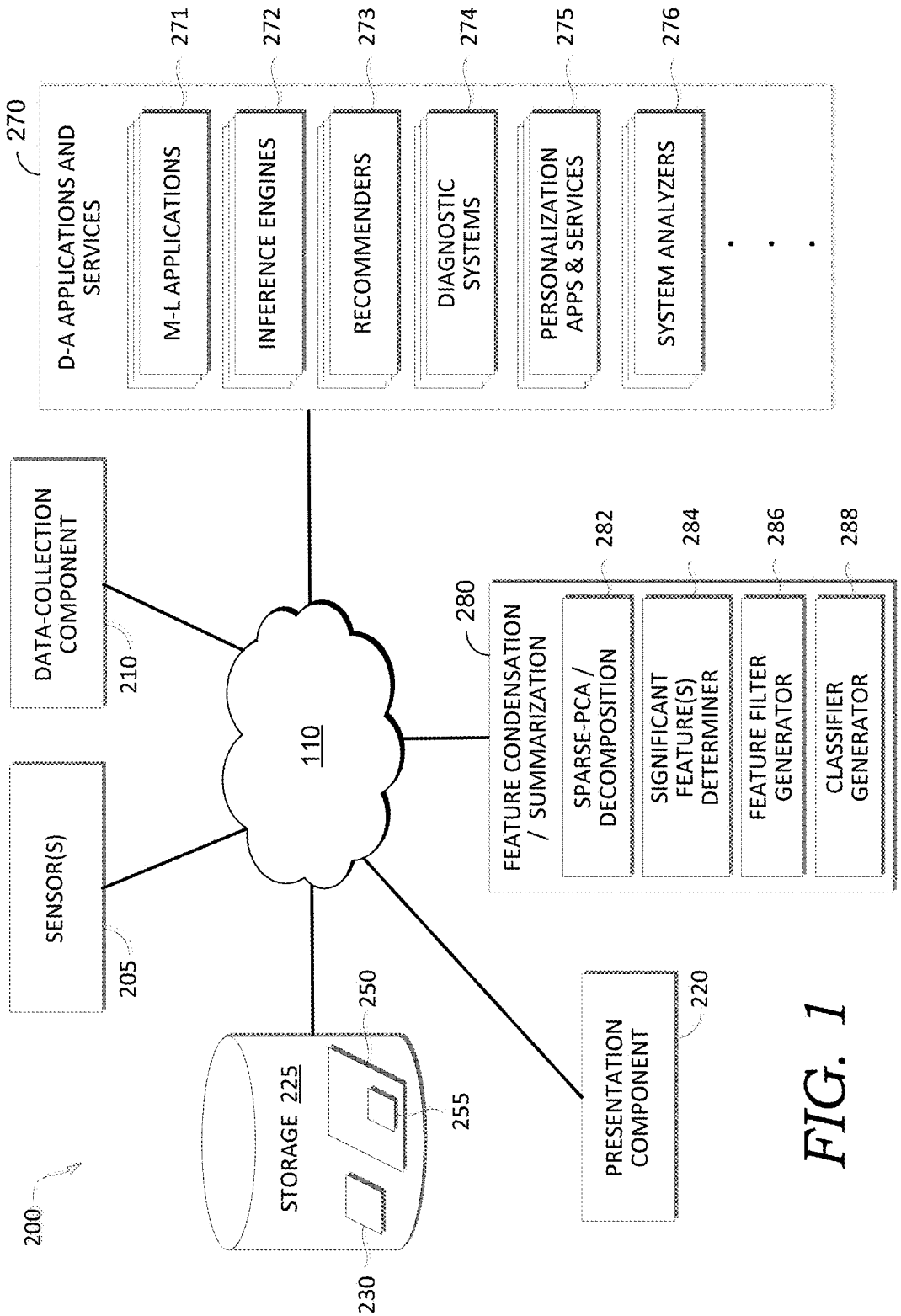
FIG. 1 is a block diagram of an example system architecture suitable for implementing aspects of the present disclosure.

The subject matter of the present disclosure is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Terms

Various terms are used throughout this description. A full definition of any term can only be gleaned by giving consideration to the full breadth of this document. However, descriptions of some of these terms are included below to provide a clearer understanding of the ideas disclosed herein:

The term "data matrix" refers to a dataset in a matrix structure form. A data matrix conceptually includes m-rows and n-columns with each row corresponding to a different monitored target and each column corresponding to a different feature. For each monitored target, the data matrix stores a data value for each feature.

The terms "monitored target" or "monitored entity" refer to a particular entity, item, instance, or thing having aspects characterized by features. For example, a monitored target may be a particular machine, system, process, event, or a user for which information is obtained using sensors or monitoring-related processes.

The term "feature" (sometimes referred to as "variable" or "dimension") refers to an attribute characterizing a specific aspect of a monitored target. For example, if the monitored target is a person, the features could be demographics (e.g., age, gender, location, income, education). As another example, if the monitored target is a vehicle, the features could be information about the engine, aspects of the vehicle's performance (e.g., acceleration, velocity, average RPMs), average rate of fuel consumption, engine temperature, road position, road type and condition, traffic, location, weather, proximity to other cars, number of passengers, passenger location, driver alertness, etc.

As used herein, the term "data value" refers to a value for a particular feature for a particular monitored target. For example, the data value for the "gender" feature for a person could be "male." Data values can be categorical values (e.g., "male" or "female" for the "gender" feature for a person), or data values can by continuous (numeric values) (e.g., 30 for the "age" feature for a person). Data values corresponding to a feature may be obtained from one or more sensors or from a monitoring or tracking process, for example, associated with the entity or thing being monitored. In some instances, a feature may correspond to one or more data values obtained from the sensors or other monitoring-related processes, and may comprise processed or interpreted feature data. For example, a data value for a feature representing velocity may be determined by interpreting raw information from sensors that indicate location and time.

The term "significant feature" refers to a feature selected from an initial set of features available in a data matrix that is significant to determining the outcome by a particular data-analytics application or service that processes the feature. In other words, significant features comprise the information about the monitored target that is most relevant (i.e., the most meaningful, informative, or actionable) for the particular application or service to provide an accurate or useful result; i.e., out of all of the features available, the significant features comprise the data that is going to matter. For instance, continuing the vehicle example above in which a number of features are used to characterize aspects of vehicles, a subset of the features, such as engine temperature, average RPMs, and average fuel consumption, could be identified by techniques described herein as significant features for a particular application directed to optimizing vehicle performance.

Conversely, the term "insignificant feature," sometimes referred to herein as "noise," refers to a feature that is not relevant (or insubstantially or marginally relevant) to determining an outcome by a particular data-analytics application or service that processes the feature. In this regard, some embodiments of the disclosure may be considered to summarize or approximate the information provided by the insignificant features by selectively determining the significant features. Thus, the set of significant features includes the most relevant information about a monitored target.

Some embodiments of this disclosure may be implemented as a filter that removes the insignificant features or noise from the data dimensions that are provided to a data-analytics application or service. Thus, for instance, in one example embodiment described herein, a significant feature set of six features is determined from a high-dimensional feature set of 324 dimensions. (The remaining 318 features are considered insignificant features or noise.) By utilizing the set of significant features instead of all of the features (such as by filtering the insignificant features), embodiments of this disclosure enable the applications, and the computing devices they operate on, to perform substantially more efficiently, while still providing an accurate result. In some instances, it is not even necessary to monitor these insignificant features, nor is it necessary to store their information. Rather, the information from the insignificant features may be discarded, ignored, or computing resources may be conserved by only deploying sensors regarding the significant features (or otherwise monitoring the significant features).

The term "sensor" is used broadly herein to refer to a device, component, function, routine, or combination thereof that senses, measures, detects, or otherwise obtains information about a property or characteristic of the monitored target, which may be considered a feature. The feature may represent a physical property or characteristic of the monitored target, such as motion-information provided by an accelerometer, or location information provided by a GPS; a physiological characteristic, such as heart rate; a usage property or characteristic, such as calls received on a mobile phone over a specified duration of time, or user browsing activity or application usage on a computing device; or nearly any other detectable property or characteristic associated with the monitored target. A sensor may be embodied as hardware, software, or a combination of hardware and software.

The term "filter" is used broadly herein and may comprise a component or process to filter out or selectively remove certain data, such as insignificant features. For instance, insignificant features may be removed from a set of features utilized by a data-analytics application or service. The term "filter" also may comprise a component or process that determines a set of significant features (or data) to retain from a set of features (such as a high-dimensional feature set) or that determines an indication of features to obtain from one or more sensors or monitoring processes.

The terms "data-analytics application or service" (sometimes referred to as just application or service) or "data-analysis system" refer to a computer-application or computer-provided service that processes features of information about a monitored target to determine a desired outcome, such as a prediction, recommendation, inference, diagnosis, or other service provided to a user, for example. For instance, one example of a data-analytics application or service might be a driver-fatigue alert system that predicts an increased likelihood that a driver will lose control within a future time interval, wherein the monitored target is the driver and vehicle the driver is driving. As another example, a system for providing personalized content to a user on a computing device may infer the content the user desires to receive, or may predict a user response to notifications or communications provided via the device, wherein the monitored target may be a user of the device. Yet another example may comprise a medical diagnostic device that emits a notification that a patient is at risk for experiencing a particular medical event, wherein the monitored target may be the patient.

Data-analytics applications and services typically include software routines or processes that use machine learning and statistical classification processes, which may be implemented as part of an inference system used to evaluate a likelihood of a condition (or a prediction) or may be part of a diagnostics system that provides insight into the monitored target. As a consequence, these data-analytics applications and services can be highly sensitive to high-dimensional data. For instance, increasing the number of data dimensions by fifty percent may increase processing computation time by a factor of eight hundred percent, in one case.

The terms "classification model" or "classifier" refer to an aspect of a data-analytics application or service that performs a classification on feature data. For instance, the above example of a driver-fatigue alert system receives feature data regarding the driver and/or car and classifies the data as to whether it indicates the driver is likely fatigued, and thus likely to lose control of the car, or is not fatigued. The classifier may be created based on the significant features, such that information for the significant features is used to perform the classification. The classifier may be based on a statistical classification process, such as logistic regression, decision trees, random forest, support vector machine (SVM), pattern analysis, neural networks, or similar classifiers. In some embodiments, a classifier may be implemented as a component or routine of the data-analytics application or service.

Overview of the Technical Disclosure

The ready access to high-dimensional data can provide data-analytics applications and services much greater insight into the monitored events, operations, or processes that produce the data. But much of this information is irrelevant noise which causes the applications and services that utilize the information to produce misleading or incorrect outcomes. Moreover, the high-dimensionality of information substantially increases the computational processing times, storage, and communication requirements for these applications and services. This undesired consequence of having too much information is sometimes called "the curse of dimensionality." As a result of this curse, the applications and services are often rendered unsuitable for operating on computing devices with limited resources, such as mobile devices, or situations where timely results are needed, such as the driver-fatigue alert system.

To address these concerns, limitations, and technical deficiencies of high-dimensional data-analytics applications and services, embodiments of this disclosure are directed to appropriately summarizing and reducing data dimensionality such that data for significant features relevant to a particular application or service is utilized while data for insignificant features is filtered out. Accordingly, aspects of the technology described herein are generally directed to, among other things, streamlining a data-analytics application and service by applying a feature-selection filtering mechanism for identifying and selectively using the most significant features for that particular application or service.

More particularly, embodiments process a dataset having an initial set of features in order to select a set of significant features that are then used in a data-analytics application or service. The dataset is in the form of a data matrix, which is processed to generate vectors, with each vector representing a given feature from the initial set of features. In embodiments, the vectors are right-singular vectors generated by applying sparse principle component analysis (sparse PCA) and decomposition to the data matrix. The vectors are grouped into clusters. For each cluster, a vector at the center of the cluster is identified. The features corresponding to each vector located at the center of each cluster are identified as significant features. Once this set of significant features is determined, it may be provided to the data-analytics application or service for use in producing a particular desired outcome, such as a prediction, recommendation, inference, or diagnosis about a monitored target, or as part of a user service, for example.

In this way, embodiments of this disclosure enable applications and computing devices they operate on, to perform much faster and more efficiently while providing a result that is nearly as accurate as slower, less efficient approaches that utilize all (or most) of the available data. Moreover, the problems resulting from using too much data (i.e., problems from high-dimensionality) are also mitigated from the embodiments described herein, which enables many of these data-analytics applications and services to operate on portable computing devices, or on computing systems with limited resources, and to provide timely results and services to end-users. Additionally, some embodiments reduce the number of sensors or monitoring processes needed, since it is not necessary to monitor the insignificant features about the target. Further, system interoperability also may be facilitated, since not all systems (or devices) may have access to or be capable of obtaining every feature of data about a target.

Technical Advantages and Solutions Provided

Embodiments of the disclosure provide a number of technical advantages. For example, when considering processor-computation time, many processes that are part of the applications and computer-services involving data analytics require a computation time that may be expressed as $O(n^3)$ where n is the number of tracked features or variables (i.e. dimensions of data) and O (or "big-O") refers to the upper bound of the growth rate used for expressing time complexity. Supposing then the number n of these data dimensions is 100 (i.e., 100 features), then the required computation time would be $O(100^3)$. But reducing the number of features or data dimensions by just half (n=50) reduces computation time to $50^3/100^3$, or ⅛ the amount of time. This new computation of time is a small fraction of the original time needed for the computation of all of the data features. In this instance, the speed of the computation time increases by a factor of 8 for this example reduction of dimension, with respect to the computation time required when using all of the original features. A reduction to ten percent (n=10) decreases computation time by a factor of 1000. In other words, embodiments of this disclosure can enable substantial reductions in the processing-computation times needed by these applications and services. As a result, these applications may become capable of deployment on mobile computing devices (e.g., a smartphone) and may be able to provide timely (such as in near-real-time) results and services to end-users. Thus, in this way, embodiments of the disclosure mitigate or solve the curse of dimensionality and enable data-analytics applications and services to perform more efficiently, timely, and with sufficient accuracy on computing devices having limited processing, storage, or communication resources.

Some alternative technologies aimed at reducing data dimension use an approach that creates a new set of dimensions to represent the existing high number of dimensions. Such approaches typically create a small number of newly created dimensions that have no clear representation of the known feature characteristics. This presents a problem that is avoided by the embodiments of the disclosure. In particular, some of the embodiments described herein choose some of the original dimensions and physical characteristics of the data as the new, reduced (or summarized) dimensions. Further, where the existing approaches are more generalized, some embodiments described herein use a data driven process that is particularly well suited for data-analytics applications and services including specific targeted campaigns, or similar utilizations.

Additionally, unlike these alternative technologies, another technical advantage provided by some embodiments of this disclosure is to identify those features that are most significant to determining the desired outcome. (In other words, identifying what matters from the noise.) This technical advantage facilitates application and system development and deployment based on the most relevant data for providing inferences, predictions, recommendations, personalized content delivery, or other outcomes. For instance, by knowing which features are significant, sensors can be deployed, or monitoring systems or processes can be developed and implemented for monitoring those features, but not necessarily all features. As a result, substantially less processing resources and data storage is required, since only the most relevant or useful data is being monitored, stored, and processed. Moreover, fewer sensors or monitoring processes may be needed as well, since it is not necessary to monitor the insignificant data dimensions.

Technical Disclosure

Having briefly described an overview of aspects of the technology described herein, an example operating environment suitable for use in implementing the technology is now described. With reference to FIG. 1, a block diagram is provided showing aspects of an example computing system architecture suitable for implementing an embodiment and designated generally as system 200. System 200 represents only one example of a suitable computing system architecture. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Example system 200 includes network 110, which communicatively couples components of system 200 including sensor(s) 205 and data-collection component 210, presentation component 220, feature condensation/summarization 280, data-analytics applications and services 270, and storage 225. These components may communicate with each other via network 110, which may include, without limitation, one or more local area networks (LANs), wide area networks (WANs), and/or a computing-system bus, such as bus 610 of computing device 600, described in connection to FIG. 6. In exemplary implementations, network 110 comprises the Internet and/or a cellular network, amongst any of a variety of possible public and/or private networks.

Figure 6:
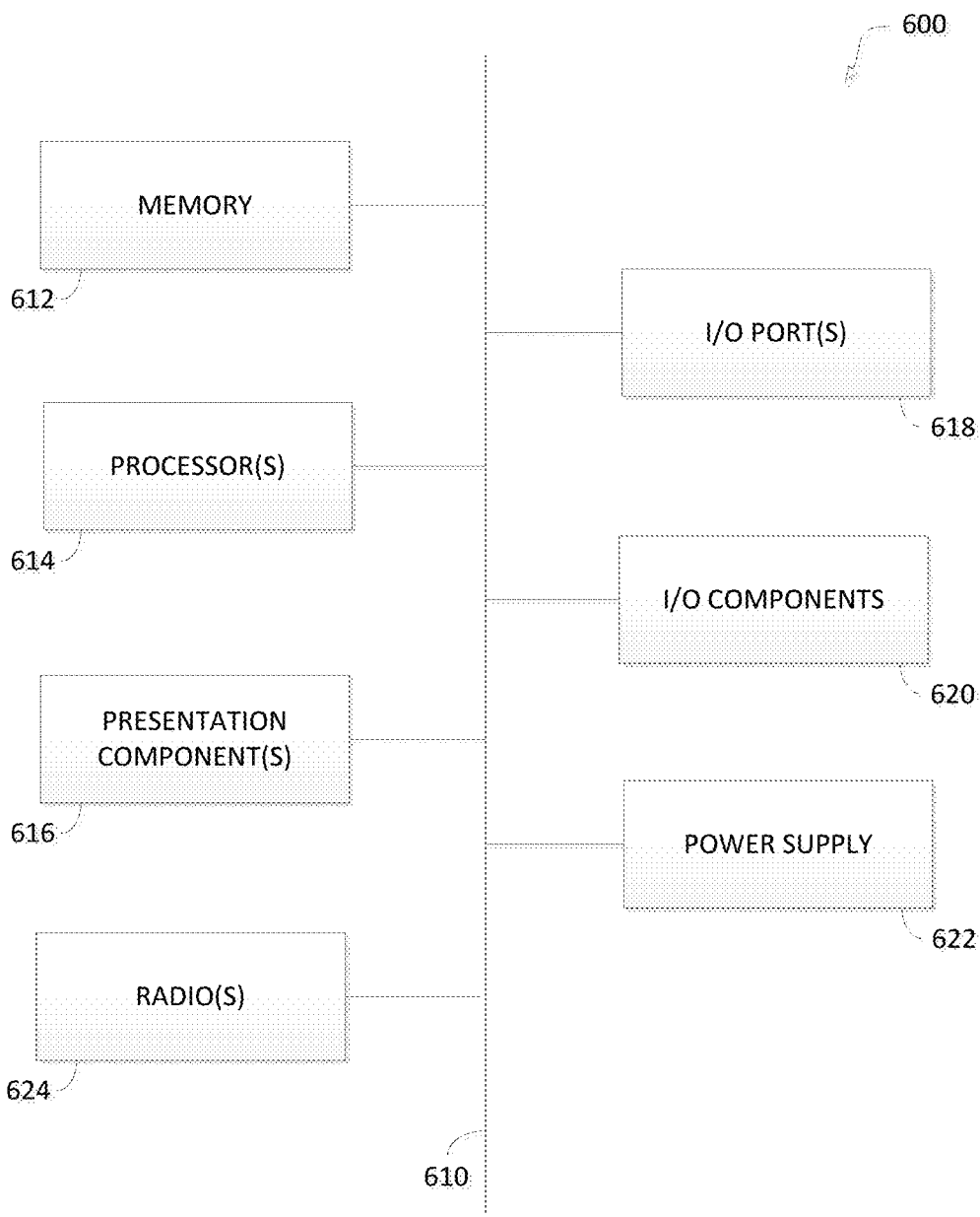
FIG. 6 is a block diagram of an example computing environment suitable for use in implementing an embodiment of the present disclosure.

Feature condensation/summarization 280 (including its components 282, 284, 286, and 288), data-analytics applications and services 270 (including its examples of applications and services 271, 272, 273, 274, 275, and 276), sensor(s) 205 and data collection component 210, and presentation component 220 may be embodied as a set of compiled computer instructions or functions, program modules, computer software services, or an arrangement of processes carried out on one or more computer systems, such as computing device 600 of FIG. 6, for example.

In some embodiments, the components of system 200 may be distributed across a network, including one or more servers (such as server 106, described in FIG. 2) and client computing devices (such as user computing device 102a, described in FIG. 2), in the cloud, or may reside on a user computing device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Figure 2:
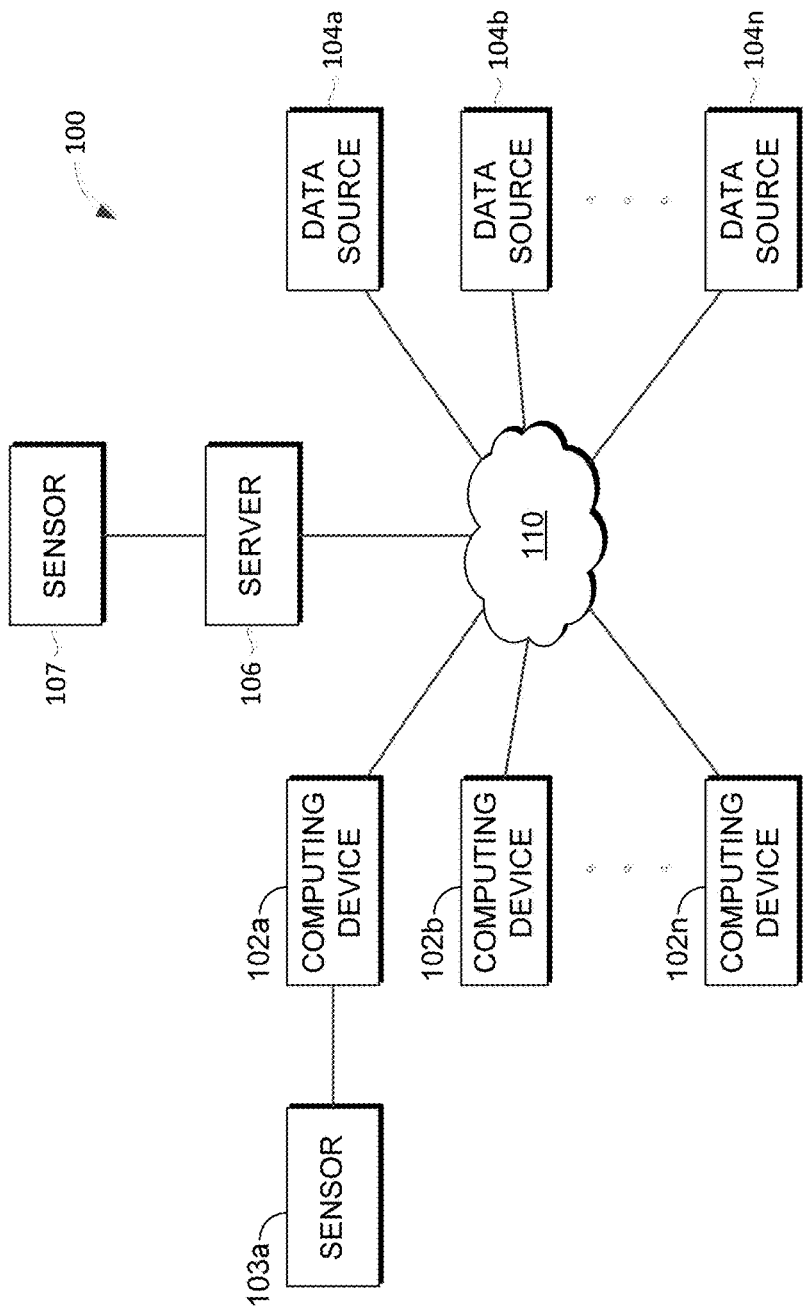
FIG. 2 is a block diagram depicting aspects of an example operating environment in which an embodiment of the present disclosure may be employed.

Turning briefly to FIG. 2, and with continuing reference to FIG. 1, a block diagram is provided in FIG. 2 showing an example operating environment 100 in which some embodiments of the present disclosure may be employed. Operating environment 100 represents only one example of a suitable operating environment. Other arrangements and elements can be used in addition to or instead of those shown, and some elements may be omitted altogether for the sake of clarity. Further, as with system 200, many of the elements described herein are functional entities that may be implemented as discrete or distributed components or in conjunction with other components, and in any suitable combination and location.

Among other components not shown, example operating environment 100 includes a number of user computing devices, such as user computing devices 102a and 102b through 102n (sometimes referred to herein as "user device"); a number of data sources, such as data sources 104a and 104b through 104n; server 106; sensors 103a and 107; and network 110, which is described in connection to FIG. 1. Each of the components shown in FIG. 1 may be implemented via any type of computing device, such as computing device 600 described in connection to FIG. 6, for example, and may communicate with each other via network 110.

Further, it should be understood that any number of user computing devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Similarly, sensors 103a or 107 each may comprise a single sensor or a network or web of sensors, and may be on or associated with a user computing device or server. Additionally, other components not shown may also be included within the distributed environment.

User computing devices 102a and 102b through 102n may be client devices on the client-side of operating environment 100, while server 106 may be on the server-side of operating environment 100. Server 106 can comprise server-side software designed to work in conjunction with client-side software on user computing devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User computing devices (user devices) 102a and 102b through 102n may comprise any type of computing device capable of use or access by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, medical device, machine controller, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 1. (For example, in one embodiment, one or more data sources 104a through 104n provide (or make available for accessing) user data to sensor(s) 205 or data-collection component 210 of FIG. 1.) Data sources 104a and 104b through 104n may be discrete from user devices 102a and 102b through 102n and server 106 or may be incorporated and/or integrated into at least one of those components. In one embodiment, one or more of data sources 104a though 104n comprise one or more sensors, which may be integrated into or associated with one or more of the user devices 102a, 102b, or 102n or server 106. Examples of sensed user data made available by data sources 104a though 104n are described further in connection to sensor(s) 205 and data-collection component 210 of FIG. 1.

Operating environment 100 can be utilized to implement one or more of the components of system 200 described in FIG. 1, including components for sensing or collecting user data; feature filtering, data-analytics applications or services, and/or generating or presenting notifications and content to a user, which may include personalized content targeted to the user.

Returning to FIG. 1, sensor(s) 205 and data-collection component 210 are generally responsible for sensing, accessing, or receiving (and in some cases also identifying) feature data, which comprises one or more data values for a particular feature, from one or more data sources, such as data sources 104a and 104b through 104n of FIG. 1. In some embodiments, sensor(s) 205 and/or data-collection component 210 may be utilized to facilitate the accumulation of feature data of a particular monitored target (or in some cases, a plurality of monitored targets) for feature condensation/summarization 280 and/or data-analytics applications and services 270. The feature data may be sensed, received (or accessed), and optionally accumulated, reformatted, and/or combined by sensor(s) 205 and/or data-collection component 210 and stored in one or more data stores, such as storage 225, where it may be available to other components of system 200. For example, the feature data may be stored as data values for an initial feature set 250 (which may be high-dimensional) or data values for significant features 255, in storage 225, as described herein. In some embodiments, any personally identifying feature data (i.e., user data that specifically identifies particular users) is either not shared or made available to anyone other than the user, is not permanently stored, and/or is not made available to feature condensation/summarization 280 and/or one or more of the data-analytics applications and services 270.

Feature data may be received from a variety of sources where the data may be available in a variety of formats. For example, in some embodiments, feature data received via data-collection component 210 may be determined via one or more sensor(s) 205, which may be on or associated with one or more user computing devices (such as user device 102a), servers (such as server 106), and/or other computing devices. The term "sensor" is used broadly herein, thus although shown as separate components, it is contemplated that data-collection component 210 may utilize one or more sensor(s) 205, and that sensor(s) 205 may be considered a data-collection component 210. Therefore, a sensor 205 may include a function, routine, component, or combination thereof for sensing, detecting, or otherwise obtaining information such as feature data from a data source 104a, and may be embodied as hardware, software, or both.

By way of example and not limitation, feature data may include data that is sensed or determined from one or more sensors 205 (sometimes referred to herein as sensor data) or data-collection components 210, such as location information of mobile device(s), properties or characteristics of the user device(s) (such as device state, charging data, date/time, or other information derived from a user device such as a mobile device), user-related activity information (for example: app usage; online activity; searches; file-related activity including cloud-storage related activity; audio or voice data such as acoustic information or data from automatic speech recognition processes; activity logs; communications data including calls, texts, instant messages, and emails; website posts; other user-data associated with communication events; etc.) including, in some embodiments, user-related activity that occurs over more than one user device, user history, session logs, application data, contacts data, calendar and schedule data, notification data, social-network data, news (including popular or trending items on search engines or social networks), online gaming data, ecommerce activity (including data from online accounts such as Adobe®, Amazon.com®, Google®, eBay®, Pay-Pal®, video-streaming services, or gaming services), user-account(s) data, home-sensor data, appliance data, global positioning system (GPS) data, vehicle signal data, traffic data, medical data which may include data about a patient, weather data (including forecasts), wearable device data, data detected from a system or machine, other computing device data (which may include device settings, profiles, network-related information (e.g., network name or ID, domain information, workgroup information, connection data, Wi-Fi network data, or configuration data, data regarding the model number, firmware, or equipment, device pairings, such as where a user of the computing device has a mobile phone paired with a Bluetooth headset, for example, or other network-related information)), gyroscope data, accelerometer data, payment or credit card usage feature data (which may include information from a user's PayPal account), purchase history data (such as information from a user's Amazon.com or eBay accounts), other sensor data that may be sensed or otherwise detected by a sensor (or other detector) 205 including data derived from a sensor 205 associated with a device, system, machine, or user, for instance (including location, motion, orientation, position, user-access, user-activity, network-access, user-device-charging, or other data that is capable of being provided by one or more sensor(s) 205), feature data derived based on other feature data (for example, location data that can be derived from Wi-Fi, Cellular network, or IP address data), and nearly any other source of feature data that may be sensed or determined as described herein. An example of a set of feature data for a particular embodiment of the disclosure is further described in connection to FIG. 5A.

In some respects, feature data may be provided in one or more data streams or signals. Thus, a "feature signal" (or "signal") can be considered a feed or stream of feature data from a corresponding data source. For example, a feature signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources, and may comprise features from more than one sensor or information about more than one property or characteristic of a monitored target. In some embodiments, sensor(s) 205 and/or data-collection component 210 sense, receive, or access feature data continuously, periodically, or as needed.

In some embodiments, sensor(s) 205, data-collection component 210, or other components of system 200 may determine interpretive feature data from received or sensed feature data. Interpretive feature data corresponds to feature data utilized by these and other components or subcomponents of system 200 to interpret feature data. For example, interpretive feature data can be used to provide context to feature data or additional information from feature data, which can support determinations or inferences made by the components or subcomponents. For instance, in some embodiments, interpretive feature data comprises features determined from other feature data, which may include statistical ratios of feature values (sometimes referred to as "relative features") used for determining locations, networks, and patterns frequently associated with a monitored target. For example, a feature representing velocity may be determined by interpreting raw feature data from sensor(s) 205 that indicate location and time.

Feature condensation/summarization 280 is generally responsible for determining a set of significant features from an available feature set, and may further include providing a filtering mechanism specifying the determined significant features and/or generating a classifier according to one or more of the significant features. The available feature set, sometimes referred to herein as an initial feature set, may comprise a high-dimensional set of features that characterize aspects of one or more monitored targets. Data values corresponding to the available feature set may be received from sensor(s) 205 and/or data-collection component 210 and stored as initial feature set data values 250 in storage 225. Some embodiments of feature condensation/summarization 280 perform an unsupervised learning process to determine a set of significant features from a high-dimensional feature set of available features, and provide these significant features or an indication about the significant features to one or more data-analytics applications and services 270. In some embodiments, feature condensation/summarization 280 determines which features to receive information about (i.e., significant features) from the greater set of available features, and uses that determination to create a classifier for use in a data-analytics application or service 270. In an embodiment, the set of significant features is determined from a process using a combined sparse principal component analysis and applying k-medoids clustering on the right-singular vectors, such as described in connection to FIGS. 3 and 4.

As shown in example system 200, feature condensation/summarization 280 comprises a sparse-PCA and decomposition component 282, significant features determiner 284, feature filter generator 286, and classifier generator 288. Although several examples of how feature condensation/summarization 280 and its sub components may determine and apply a set of significant features are described herein, many variations of feature filtering or otherwise determining and utilizing the significant features are possible in various embodiments of the disclosure.

Sparse-PCA and decomposition component 282 is generally responsible for performing sparse principle component analysis (PCA) and decomposition on feature data values 250 from an initial feature set of available features. As further described in connection to FIGS. 3 and 4, sparse-PCA and decomposition are performed on an initial set of features to determine a set of right-singular vectors. The decomposition is performed using singular value decomposition (SVD) or Eigenvalue decomposition, which may be constrained so that the singular vectors produced are sparse. Rank-1 approximation may be used to achieve sparsity.

Figure 5A:
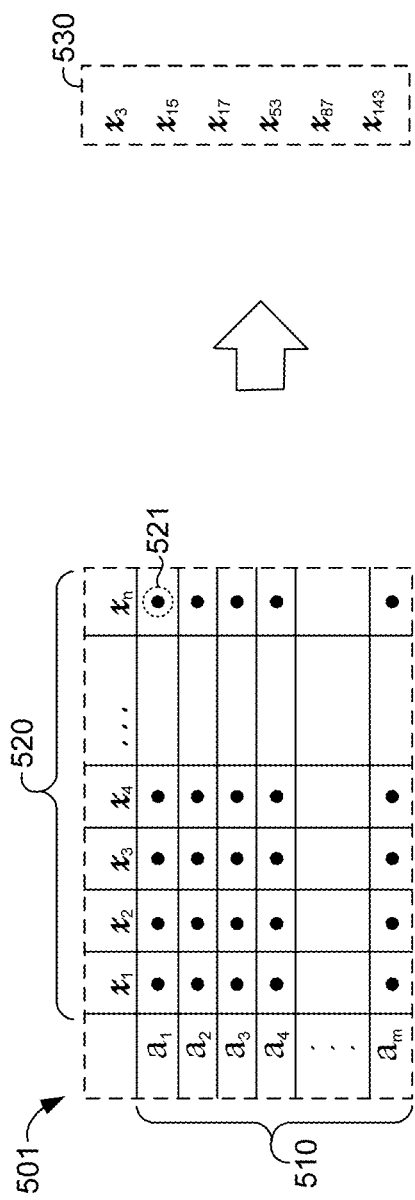
FIGS. 5A and 5B depict aspects of an example embodiment of the present disclosure.

In some embodiments, the feature data values 250 from the initial feature set of available features are received as or organized as a matrix wherein the columns of the matrix correspond to each particular feature and the rows of the matrix correspond to a particular monitored target, from a plurality of monitored targets, or an instance of observation about a monitored target. Accordingly, sparse principle component analysis (PCA) and decomposition may be performed on the matrix to determine the set of right-singular vectors. Turning briefly to FIG. 5A, with continuing reference to FIG. 1, an example of one such matrix 501 is depicted. Example matrix 501 includes n columns of features 520, which may be considered dimensions (or feature dimensions), from $x_1$ to $x_n$. Example matrix 501 also includes m rows of data 510, with each row from $a_1$ to $a_m$ corresponding to a monitored target or an instance of observation about a monitored target. For example, each row 510 might correspond to a different monitored user with each column (a feature) indicating a piece of information about the user, such as the user's location. Alternatively, each row 510 may correspond to an instance of observation about the same user (target) with each column (a feature) indicating a piece of information about that observation, such as the user's location during that observation. Some embodiments of sparse-PCA and decomposition component 282 (or feature condensation/summarization 280) may receive feature data values 250 from the initial feature set of available features and structure the feature data as a matrix, such as matrix 501. Further, in some embodiments, sparse-PCA and decomposition component 282 (or feature condensation/summarization 280) may normalize the feature data prior to performing sparse-PCA and decomposition. For example, the feature data may be centered and scaled with respect to each column of the matrix, in an embodiment.

Returning to FIG. 1, significant features determiner 284 is generally responsible for determining the significant features based on the sparse-PCA and decomposition of the feature data values 250 from the initial feature set. In some embodiments, the set of features is determined using k-medoids clustering. For example, as further described in connection to FIGS. 3 and 4, significant features determiner 284 first determines a number of features r to be selected from amongst the initial feature set. (Thus, r is the number of members that will be in the set of significant features.) In some embodiments, r is determined based on feature dimension logic 230. Feature dimension logic 230 comprises a set of rules, conditions, or associations for determining r. For instance, feature dimension logic 230 may specify a rule to preserve at least ninety-percent of the information included in the initial feature set. In another instance, a rule may specify that the number of dimensions should be reduced to five percent or alternatively, the number of significant features should be four. In some embodiments, r is determined based on feature dimension logic 230 and the particular target or entity that is monitored, the data-analytics application that will use the set of significant features, the features in the initial feature set, and/or the feature data of the features. For instance, r may be determined based on a parameter associated with the data-analytics application, which may be predetermined or determined according to preference specified by an application developer or user, based on the operating environment of the application (e.g., based on the computer resources of the computing system the application operates on), and/or based on a purpose or performance of the application. Additional embodiments and details for determining r are described in connection to FIGS. 3 and 4.

Once r is determined, significant features determiner 284 clusters the plurality of right-singular vectors, determined by sparse-PCA and decomposition component 282, into r clusters. Each of the right-singular vectors determined by sparse-PCA and decomposition component 282 corresponds to a column of the matrix and thus corresponds to a particular feature in the initial feature set. Next, for each of the clusters, significant features determiner 284 determines the medoid (i.e., the right-singular vector at the center of the cluster). As a result, a set of r medoids (or r cluster-center, right-singular vectors) is determined. For each of the right-singular clusters in this set, significant features determiner 284 identifies the corresponding matrix column and its corresponding feature from the initial feature set to determine the set of significant features. Additional details for determining the set of significant features are described in connection to FIGS. 3 and 4.

Feature filter generator 286 is generally responsible for providing a filtering mechanism specifying the determined significant features. As described previously, based on the determined set of significant features, insignificant features or noise may be filtered out, or otherwise not provided to the application or service, not used, or in some instances not even monitored (thus reducing the number of sensors needed and conserving computing resources) because the information represented by the insignificant features is approximated or summarized by the significant features. Thus, in some embodiments, a filter is not used or applied to a particular data-analytics application because only significant data features are collected in the first place. Alternatively, in some embodiments, a filter determined by feature filter generator 286 may be applied to or utilized by a data-analytics application for removing insignificant features or for specifying the significant features.

Classifier generator 288 is generally responsible for determining a classifier from the set of significant features determined by significant features determined 284, and applying the classifier as part of a data-analytics application or service 270. For example, a classification model may be created based on one or more significant features and/or trained using feature data from one or more significant feature and deployed as a classifier within or in connection to a data-analytics application or service 270. Depending on the particular application or service, or the nature of the feature data, classifier generator 288 may determine one or more appropriate statistical classification processes for use in the generated classifier. For instance, the classifier may use logistic regression, multiple regression, decision tree, random forest, support vector machine (SVM), neural network, or another statistical classification algorithm or procedure. In some embodiments, the generated classifier is incorporated into a particular application or service 270 or may be utilized by the application or service 270. In some instances, the classifier is used when developing the application or service 270.

Continuing with system 200 of FIG. 1, data-analytics applications and services 270 comprises one or more data-analytics applications and services as described above. In particular, a data-analytics application or service 270 utilizes the significant features data to determine a desired outcome, such as a prediction, recommendation, inference, diagnosis, or other service provided to a user, for example. In some embodiments, data-analytics applications or services 270 include processes that incorporate machine learning and statistical classification techniques, such as logistic regression, decision trees, random forest, support vector machine (SVM), pattern analysis, neural networks, or similar classifiers, which may be determined from classifiers generator 288. For example, a classifier may be implemented as part of an inference system used to evaluate a likelihood of a condition (or a prediction) about the monitored target (or a user associated with the monitored target) or may be part of a diagnostics system that provides insight into the monitored target. Data-analytics applications and services 270 may operate on one or more computing devices (such as user computing device 102a), servers (such as server 106), may be distributed across multiple user devices and servers, or be implemented in the cloud.

Examples of data-analytics applications and services 270 include, by way of example and not limitation, machine-learning applications 271, inference engines 272, recommenders 273, diagnostic systems 274, personalization apps and services 275, and system analyzers 276. Machine-learning applications 271 include applications or services that employ machine-learning processes. For example, computer-aided vision or automatic speech recognition and understanding are typically implemented utilizing machine learning, and may include applications or services that are specifically developed (by way of training) using the significant features determined from feature condensation/summarization 280. Inference engines 272 include applications or services that include determining an inference or making a prediction about the monitored target (or a related entity, such as a user associated with the monitored target). In some instances, the inference may be based on a pattern of observations about the target or a plurality of targets.

Recommenders 273 include applications or services that provide a recommendation based on an analysis of the monitored target (or a related entity, such as a user associated with the monitored target). The recommendation may be provided to a user or may be used to provide other services to a user, such as personalized content, for example. For instance, a music-recommender application 270 may learn the types of music that a user listens to and patterns associated with the user's activity related to music (such as browsing web sites of bands, purchasing music albums, etc.). Thus, the music and user activity may be monitored and from an initial set of features characterizing aspects of this (such as when the user listens to music, how long the user spends on a band's website, which bands or websites the user visits and for how long, etc.) a set of significant features may be determined and provided to the music-recommender application. A classifier determined from this information by classifier generator 288 may be incorporated into the music-recommender application 270 and used to distinguish music or bands that the user may like from music or bands that the user may not like. Based on these classifications, the user may be provided with recommendations or other personalized content, such as suggestions for music to listen to, concert promotions, etc.

Diagnostic systems 274 include applications or services that provide information about a monitored target. For example, whether a particular machine is performing optimally, is broken, or is likely to malfunction; whether a patient is at risk for developing a disease or experiencing a medical event; or how a user or system behaves or reacts under certain conditions. In some embodiments of diagnostic systems 274, the significant features may be those features that provide the most useful information for characterizing the target; for example, those features that are useful to determine that the target, such as a machine, is malfunctioning; or, those features that are most likely going to elicit a certain behavior response by another target, such as a person. Thus, in one example, a set of significant features determined to most likely elicit a certain behavior response from a user may be used for providing content to the user and/or determining the manner that the content should be provided to elicit a desired response, such as the user visiting a website, making a purchase, clicking a link, etc. The content may be provided in a notification, social media post, email, SMS text message, or other communication, for example, and may in some instances be personalized to the user according to one or more significant features.

Personalization apps and services 275 include applications and services that tailor content or otherwise provide personalized content to a user. For example, the music-recommender application described above provides content (e.g. music suggestions and concert promotions) tailored to the user's tastes. Continuing with this example, user behavior may be monitored, such as a user's activity on a web site, and used to provide a personalized experience for the user. The user activity on a website may be monitored by a monitoring process or routine operating on the user's computing device and/or via a script in the website code downloaded to and executed by the computing device. The music-recommender application may observe the types of bands and music that a user engages with on a music-related website. Based on a set of determined significant features that characterize the user activity (and possibly characterize other aspects of the user such as location, age, income, etc.), the music-recommender may provide a notification to the user about concert tickets the user may be interested in reserving. The notification may be an email, SMS or text message, or social media communication directed to the user, for example.

System analyzers 276 include applications and services that, like diagnostic systems 274, provide information about a monitored target. Data analyzers 276 may use the set of significant features to provide useful analysis, such as insight, about the monitored target. Thus, as with diagnostic systems 274, the significant features comprise those features that provide the most useful information for characterizing the target.

As described previously, in many instances, the significant features determined from feature condensation/summarization 280 are integral to a data-analytics application or service 270; thus, a particular application or service 270 may be determined or even generated based on one or more of the significant features. For example, in some embodiments, significant features are used to determine a classifier, which may be applied as part of the application or service 270. Thus, using the example of computer-aided vision described above, suppose one of the significant features determined for an application for inferring driver-fatigue is driver-eye movement, the application may utilize a classifier specifically generated (or trained) by classifier generator 288 to distinguish eye movement associated with an alert driver from eye-movement associated with a fatigued driver.

Additionally, although example applications and services 271-276 are shown as separate components, in some cases, a specific instance of an applications or service 270 may fall into more than one type of application or service 271-276. For example, a driver-fatigue alert system may include an inference engine (to infer that the diver is fatigued) and a recommender (to recommend the driver pull-over) or a system analyzer (to analyze the vehicle and driver response in order to determine a likelihood of fatigue).

Example system 200 also includes storage 225 and presentation component 220. Storage 225 includes feature dimension logic 230, initial feature set data values 250, and significant feature data values 255, as described previously. Presentation component 220 is generally responsible for presenting content and related information to a user. For example, presentation component 220 may facilitate presenting aspects of or content associated with data-analytics applications and services 270, which may include a graphical user interface, in some instances. Presentation component 220 may comprise one or more applications or services on a user computing device, across multiple user devices, or in the cloud. For example, in one embodiment, presentation component 220 manages the presentation of content to a user across multiple user devices associated with that user. Presentation component 220 may determine on which user device(s) content is presented. In some embodiments, presentation component 220 generates user interface features. Such features can include interface elements (such as graphics, buttons, sliders, menus, audio prompts, alerts, alarms, vibrations, pop-up windows, notification-bar or status-bar items, in-app notifications, or other similar features for interfacing with a user), queries, and prompts.

Figure 3:
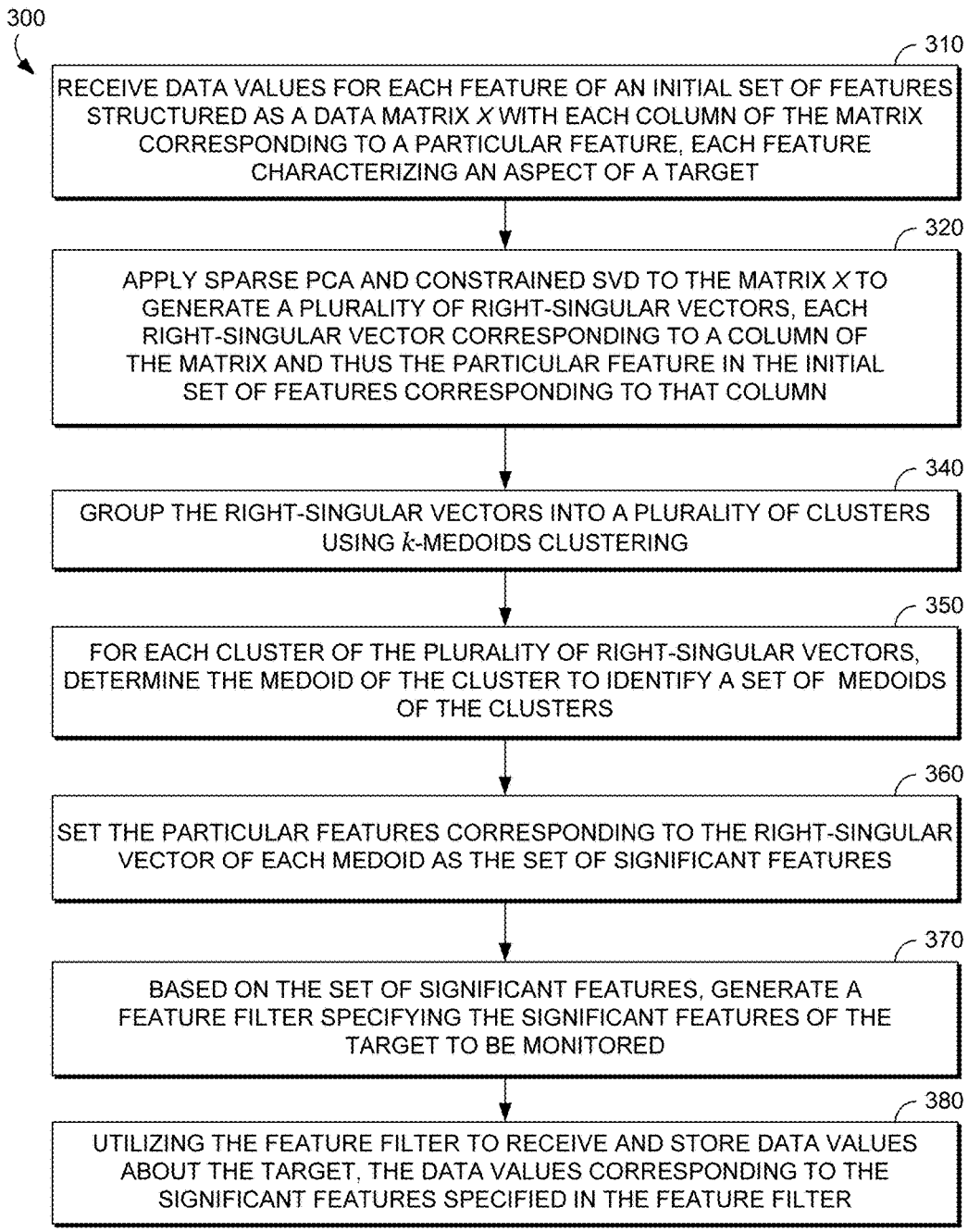
FIG. 3 depicts a flow diagram of a method for determining a set of significant features about a monitored target for use by a data-analytics application, in accordance with an embodiment of the present disclosure.

Turning to FIG. 3, a flow diagram is provided illustrating one example method 300 for determining a set of significant features about a monitored target for use by a data-analytics application. Each block or step of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few. Accordingly, method 300 may be performed by one or more computing devices, such as a smart phone or other user device, a server, by a distributed computing platform, such as in the cloud, or other computing device such as computing device 600 described in connection to FIG. 6. A set of one or more significant features may be determined from an initial feature set of feature data received via one or more data-collection components 210 (which may include one or more sensor(s) 205).

At step 310, the method includes receiving data values for each feature of an initial set of features structured as a data matrix X, with each column of the matrix corresponding to a particular feature of the initial set of features and each feature characterizing an aspect of a target. Thus each column of matrix X may be considered a data dimension. In embodiments of step 310, the initial set of data values may be received via one or more sensors (which may comprise one or more data-collection components 210) associated with a target or plurality of targets being monitored. A monitored target may comprise a system or machine, an event which may include a transaction or series of transactions, a user, an instance of or series of user interactions with a computing device, or any combination of these, for example. Some embodiments of step 310 may be performed by feature condensation/summarization 280, or its subcomponents. Additional details regarding step 310 and the structure of a matrix X are described in connection to feature condensation/summarization 280 of FIG. 1 and example matrix 501 of FIG. 5A; for example, in one embodiment, each row represents a data entry for information about the initial features (columns) and corresponds to a different monitored target or a different instance of observation about the same monitored target.

In some embodiments, method 300 may further comprise normalizing the data values received in step 310, when needed. For example, the data values of matrix X may be centered and scaled with respect to the columns (features). In particular, in some instances, it may be desirable to scale or weight certain feature's data values so that they do not have a disproportionate impact for determining the set of significant features, or when utilized in a classifier as part of a data-analytics application or service.

At step 320, sparse principle component analysis (sparse PCA) based on constrained singular value decomposition (SVD) are applied to the matrix X to generate a plurality of right-singular vectors. (Alternatively, in some embodiments of method 300, Eigenvalue decomposition may be performed instead of SVD.) Each of the right-singular vectors corresponds to a column of matrix X and thus corresponds to a particular feature in the initial feature set. A result of the decomposition performed in step 320 is to produce three matrices from matrix X a matrix of left-singular vectors U, right-singular vectors V, and a matrix of singular values D (sometimes referred to as the dissimilarity matrix). Further, the decomposition may be constrained so that the left and right singular vectors are sparse. Rank-1 approximation may be used to achieve sparsity. Embodiments of step 320 may be performed by sparse PCA and decomposition component 282 or by feature condensation/summarization 280, described in connection to FIG. 1.

In one embodiment of step 320 in particular, SVD of matrix X, having m rows and n columns gives:

$X = UDV^\tau$

For $UU^\tau = U^\tau U = I,$ $VV^\tau = V^\tau V = I,$ and $D = \text{diag}(d_1, d_2, \ldots, d_n)$ with the singular vectors; $d_1 \geq d_2 \geq \ldots \geq d_n \geq 0$. To achieve sparse PCA, rank constrained PCA (SVD) of the matrix X may be computed as follows, using Rank-1 approximation to matrix X:

$$\underset{(u,v,\sigma)}{\arg\min} \|X - duv^\tau\|_2^2 \quad \text{s.t.} \quad \|v\|_2^2 = \|u\|_2^2 = 1$$

with the rank constraints:

$\min\|v\|_0$ and $\min\|u\|_0$

But since zero-norm is computationally unfeasible, we use penalty rank-1 penalty to achieve sparsity.

$\min\|v\|_1$ and $\min\|u\|_1$

At step 340, group the right-singular vectors from the plurality of right-singular vectors into a plurality of clusters using k-medoids clustering based on the decomposition In embodiments of step 340, based on the decomposition determined in step 320, k-medoids clustering is performed to determine a number (represented as r) of the plurality of clusters of the of right-singular vectors V (determined in step 320). The k-medoids clustering determines the right-singular vectors to be included in each cluster by determining the distance between each right-singular vector and minimizing the distance (i.e., so that each cluster contains a subset of similar right-singular vectors). In particular, the objective of k-medoids clustering is to determine clusters C by computing:

$$\min \sum_{i'=1}^{r} \sum_{C(i')} s_{ii'},$$

where i' represents the medoid of a particular cluster C(i') and $S_{ii'}$ represents the distance (dissimilarity) between the point i inside the cluster C(i') and i'. In other words, using right singular vectors as the points inside the cluster C(i'), we have: $S_{ii'} = S(v_i, v_{i'})$ for $v_i$ to be the i-th right singular vector and $v_{i'}$ to be the corresponding medoid (another right singular vector) of cluster C(i'). The dissimilarity matrix S is defined as:

$S_{ii'} = S(v_i, v_{i'}) = \Sigma_{j=1}^{n} s_j(v_{ij}, v_{i'j})$

Embodiments of steps 340, 350, and 360 may be performed by significant features determiner 284 or by feature condensation/summarization 280, described in connection to FIG. 1.

The number r of the plurality of clusters corresponds to the number of significant features that will be determined from method 300. Thus, r may be considered the number of dimensions into which is condensed the information representing the initial feature set. Some embodiments of step 340 further comprise determining r. In these embodiments, the value determined for r is typically smaller than the total number of features (or dimensions, represented by the number of columns n in matrix X), to avoid the curse of dimensionality and other technical deficiencies described previously, and may be determined based on an objective to preserve a significant amount of the information in the initial feature set. Thus the determination of r may reflect a trade-off between the preservation of the maximum amount of information in the original data versus the advantages (described previously) of using only a fraction of the number of total features.

In some embodiments, r is determined based on feature dimension logic 230, as described in FIG. 1. In particular, feature dimension logic 230 comprises a set of rules, conditions, or associations for determining r, and in some instances may be referred to as a predetermined objective. (That is, the feature dimension logic 230 is pre-determined, but fulfilling specific conditions may be based on the circumstance, such as the determined singular values, feature data, or goals.) In one instance, feature dimension logic 230 specifies a rule (or goal) to preserve at least ninety percent (or other percent-ratio) of the information included in the initial feature set. For example, in one particular embodiment, r is determined based on a ratio of information in the set of significant features verses the initial feature set, which may be represented as:

$$\frac{\sum_{i=1}^{r} di}{\sum_{i=1}^{n} di} = w,$$

where $d_i$ are the diagonals of matrix D (determined from step 320), and w is the percent of information to be preserved, such as ninety-percent. Similarly, r may be determined by using the above ratio and observing the change in w, as r increases from 1. For instance, with each increase of r, as w changes significantly, then r may be increased. But when r reaches a point that the incremental improvement to w becomes insignificant (e.g., only a fraction of a percent improvement), then it is no longer valuable to increase r, and thus the value of r has been determined.

In another instance, a rule may specify that the number of dimensions (features) of the initial feature set should be reduced to five percent (i.e., a ninety five percent reduction of features) or alternatively, the number of significant features should be four (or another fixed number). In yet another instance, a condition may specify determining r based on the result of the constrained SVD (determined in step 320). For example, r may be determined based on a gap in the singular values determined in step 320, such that r is the number of highest value singular values clustered together above the gap. For instance, if the singular values (ranked from highest to lowest) include 9.98, 9.64, 9.44, 9.12, 8.87, 1.24, 0.98, 0.65, etc., then a gap (from 8.87 to 1.24) can be identified between the fifth and sixth singular value. Five singular values have values that are close to each other above this gap; therefore, according to this example of feature dimension logic 230, r would be determined as 5.

In some embodiments, r is determined based on feature dimension logic 230 and information about the target (or plurality of targets) that is monitored, the data-analytics application or service that utilizes the significant features, the specific features included in the initial feature set, and/or the nature of the feature data of the features. For instance, r may be determined based on a parameter associated with the data-analytics application, which may be predetermined or determined according to preference specified by an application developer or user, based on a threshold of information required by a particular classifier incorporated in the application, based on the operating environment of the application (e.g., based on a determination of the computer resources of the computing system the application operates on or on which the application is likely to be installed; for example), and/or based on a purpose or performance of the application; for example the application needs to be able to provide results in real time (or near real time).

At step 350, for each cluster of right-singular vectors determined in step 340, determine the medoid of the cluster to identify a set of medoids of the clusters. In particular, each of the clusters determined in step 340 includes right-singular vectors that may be considered to represent similar data (e.g., data that may be considered to be highly correlated with the other right-singular vectors). Thus, for each cluster, step 350 determines a single right-singular vector that best represents the cluster, such as the single right-singular vectors at the statistical center of the cluster (i.e., the medoid). (For instance, in one embodiment of steps 340 and 350, within each cluster, the distance from each of the right-singular vector of the cluster and the statistical center of the cluster is determined, and then all of the clusters are added.) In this way, this center single right-singular vector represents (i.e., summarizes or condenses) the information from the other right-singular vectors in its cluster.

At step 360, setting the particular features corresponding to the right-singular vector of each medoid as the set of significant features. In embodiments of step 360, for each cluster, the right-singular vectors determined to be the center right-singular vector of the cluster are identified and the corresponding feature in the initial feature set is determined. As described in step 320, each of the right-singular vectors determined in step 320 corresponds to a column of matrix X and thus corresponds to a particular feature in the initial feature set. Therefore, in an embodiment of step 360, the particular feature that corresponds to the center right-singular vector of each cluster is identified and designated as a significant feature.

At step 370, based on the set of significant features, generating a feature filter specifying the significant features of the target to be monitored. As described herein, the target may be monitored by one or more data-analytics applications or services to provide a prediction, recommendation, inference, diagnostic, or similar service about the monitored target, for example. Based on the set of significant features determined in step 360, a feature filter may be determined to remove insignificant features or noise (or otherwise not provide the noise) to the data-analytics application nor service. In some embodiments, a feature filter may be applied to or incorporated as part of the application or service, or may be used to generate a classifier used by the application or service. In one embodiment, the feature filter determined in step 370 may be used to determine which features information about the monitored target to collect the first place. Insignificant features (features not specified in the feature filter) need not be observed (thus reducing the number of sensors needed and conserving computing resources) because the insignificant features represent no significant information or noise or because the information represented by the insignificant features is expressed by significant features anyways (due to correlation of these features). Some embodiments of step 370 and 380 are performed by feature filter generator 286 or by feature condensation/summarization 280, described in connection to system 200 of FIG. 1.

At step 380, utilize the feature filter to receive and store data values about the target, the data values corresponding to the significant features specified in the feature filter. Embodiments of step 380 apply the feature filter determined in step 370 to one or more data collection components (such as data-collection component 210 or sensor(s) 205) to receive data values about the monitored target for the significant features. For instance, embodiments of step 380 may store the received data values for the significant features in a data store, such as data values for significant features 255, in storage 225 of FIG. 1. Some embodiments of step 380 utilize the feature filter determined in step 370 with a data-analytics application to receive and store the feature data of the significant features.

Some embodiments of method 300 further comprise accessing the stored data values of the significant features and utilizing it, by the data-analytics application, to provide a prediction, recommendation, inference, diagnostic, or similar service about the monitored target, for example. Further, in one embodiment, the stored data values may be utilized to generate a classifier that may be incorporated into the data-analytics application to facilitate providing the prediction, recommendation, inference, diagnostic, or similar service. For example, classifier generator 288 may be used to generate a classifier, as described in connection to FIG. 1.

Figure 4:
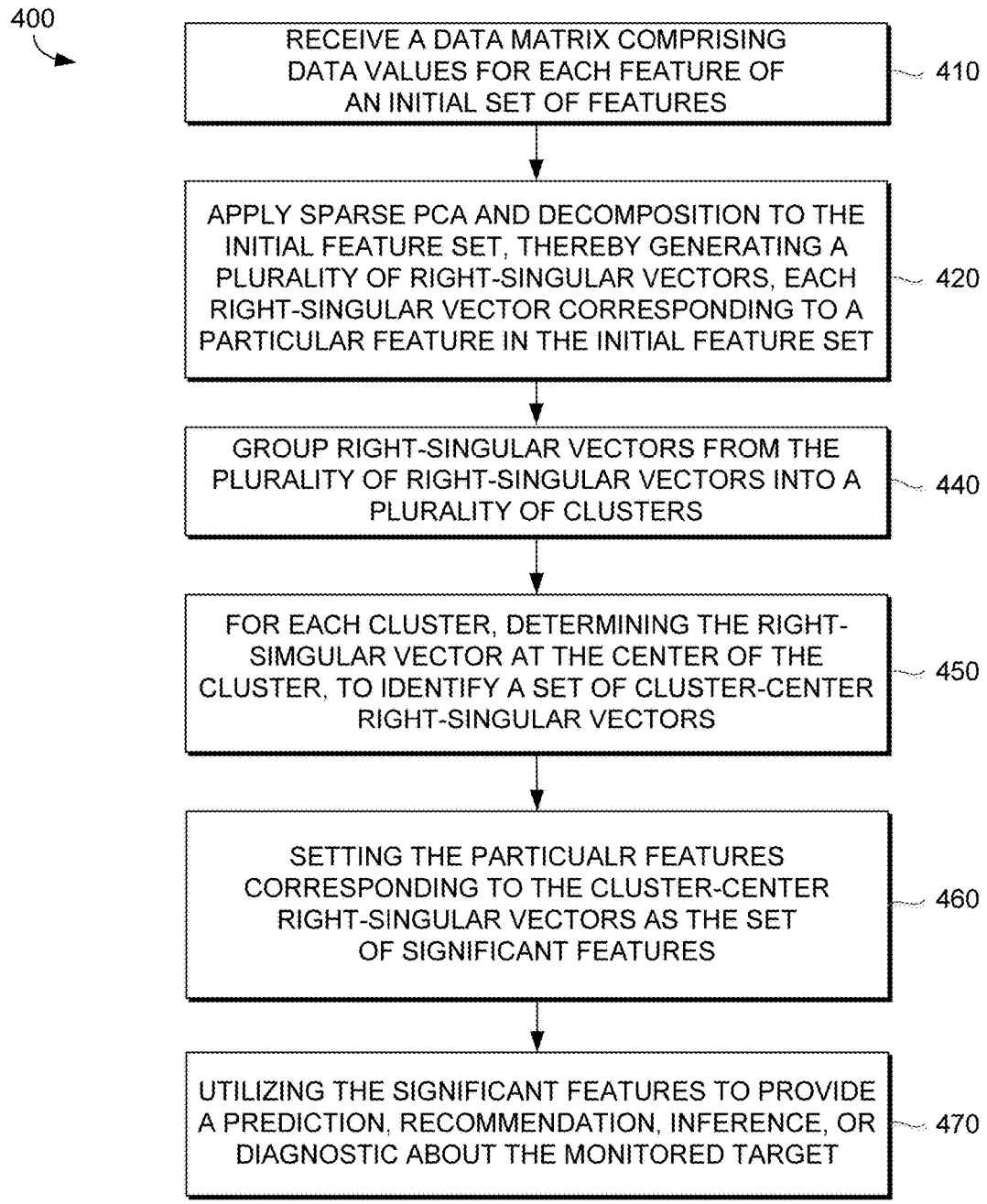
FIG. 4 depicts a flow diagram of a method for determining and utilizing a set of significant features in an application, in accordance with an embodiment of the present disclosure.

With reference now to FIG. 4, a flow diagram is provided illustrating an example method 400 for determining and utilizing a set of significant features in an application. At step 410, receive a data matrix comprising data values for each feature of an initial set of features characterizing a monitored target. In embodiments of step 410, data values are received for an initial set of features about a monitored target. Each feature characterizing an aspect of the target. The data values may be received via one or more sensors (which may comprise one or more data-collection components 210) associated with a target or plurality of targets being monitored. A target may comprise a system or machine, an event which may include a transaction or series of transactions, a user, an instance of or series of user interactions with a computing device, or any combination of these, for example. Some embodiments of step 410 may be performed by feature condensation/summarization 280, or its subcomponents.

In some embodiments, step 410 may further perform structuring or organization of the received data values into the matrix, such as matrix X described in method 300 or matrix 501 described in FIG. 5A, wherein each column of the matrix corresponds to a particular feature of the initial feature set. Alternatively, in some instances, the data values may be received in a matrix structure. Embodiments of step 410 or method 400 may further comprise normalizing the data values of the initial feature set received in step 410, as needed, such as described herein. Some embodiments of step 410 are carried out as described in step 310 of method 300 (FIG. 3).

At step 420, apply sparse PCA and decomposition to the initial feature set, thereby generating a plurality of right-singular vectors, each right-singular vector corresponding to a particular feature in the initial feature set. Embodiments of step 420 may perform singular value decomposition (SVD) or Eigenvalue decomposition, and use Rank-1 approximation to achieve sparsity of the right-singular vectors. Some embodiments of step 420 are carried out as described in step 320 of method 300 (FIG. 3).

At step 440, group right-singular vectors from the plurality of right-singular vectors into a plurality of clusters. Embodiments of step 440 determine a plurality of clusters of the plurality of right-singular vectors based on the decomposition determined in step 420. In particular, the right-singular vectors produced by the decomposition may be clustered by determining the statistical differences between each vector and forming clusters that include vectors with minimum distance between each other. In some embodiments, k-medoids clustering is used to determine the clusters, as described in connection to method 300. In other embodiments, other statistical clustering processes may be used. Some embodiments of step 440 also may be implemented as described in step 340 of method 300 (FIG. 3).

Some embodiments of step 440 further comprise determining the number r of the plurality of clusters, which corresponds to the number of significant features determined from method 400. Thus some embodiments of step 440 determine the number r of significant features from among the initial feature set corresponding to the data values received in step 410. In some embodiments, r is determined based on feature dimension logic 230, as described in FIG. 1 and as further described in the example embodiments of method 300. In one embodiment, r is determined based on a parameter associated with a data-analytics application, which may be predetermined or determined according to preferences specified by an application developer or user, based on a threshold of information required by a particular classifier incorporated in the application, based on the operating environment of the application (e.g., based on a determination of the computer resources of the computing system the application operates on or on which the application is likely to be installed, for example), and/or based on a purpose or performance of the application; for example the application needs to be able to provide results in real time (or near real time).

At step 450, for each cluster, determining the right-singular vector at the center of the cluster, to identify a set of cluster-center right-singular vectors. Embodiments of step 450 determine, for each of the r clusters determined in step 440, the right-singular vector that best represents the center of the cluster (sometimes referred to as the "cluster-center right-singular vectors"). Some embodiments of step 450 also may be implemented as described in step 350 of method 300 (FIG. 3).

At step 460, setting the particular features corresponding to the cluster-center right-singular vectors as the set of significant features. In embodiments of step 460, for each cluster, the right-singular vector determined to be the center right-singular vector of the cluster is identified and the corresponding feature in the initial feature set is determined. As described in step 420, each of the right-singular vectors determined in step 420 corresponds to a particular feature in the initial feature set. Accordingly, in embodiments of step 460, the particular feature that corresponds to the center right-singular vector of each cluster is identified and designated as a significant feature.

At step 470, utilize the significant features to provide a prediction, recommendation, inference, or diagnostic about the monitored target. In embodiments of step 470, one or more of the significant features determined in step 460 are utilized to provide a prediction, recommendation, inference, diagnostic, or similar service about the monitored target based on data values for the significant features for the monitored target. In some embodiments, one or more of the significant features may be utilized by a data-analytics application or service to provide the prediction, recommendation, inference, diagnostic, or similar service, such as data-analytics applications and services 270, as described herein. For example, in an embodiment, one or more of the significant features may be used to generate a feature filter that may be applied to or used by data-analytics application and service, such as described in connection to steps 370 and 380 of method 300 (FIG. 3). Alternatively or in addition, one or more of the significant features may be used to generate a classifier that may be used with or incorporated as part of a data-analytics application and service to provide the prediction, recommendation, inference, diagnostic, or similar service, as further described in connection to classifier generator 288 and data-analytics applications and services 270 of system 200 (FIG. 1).

Figure 5B:
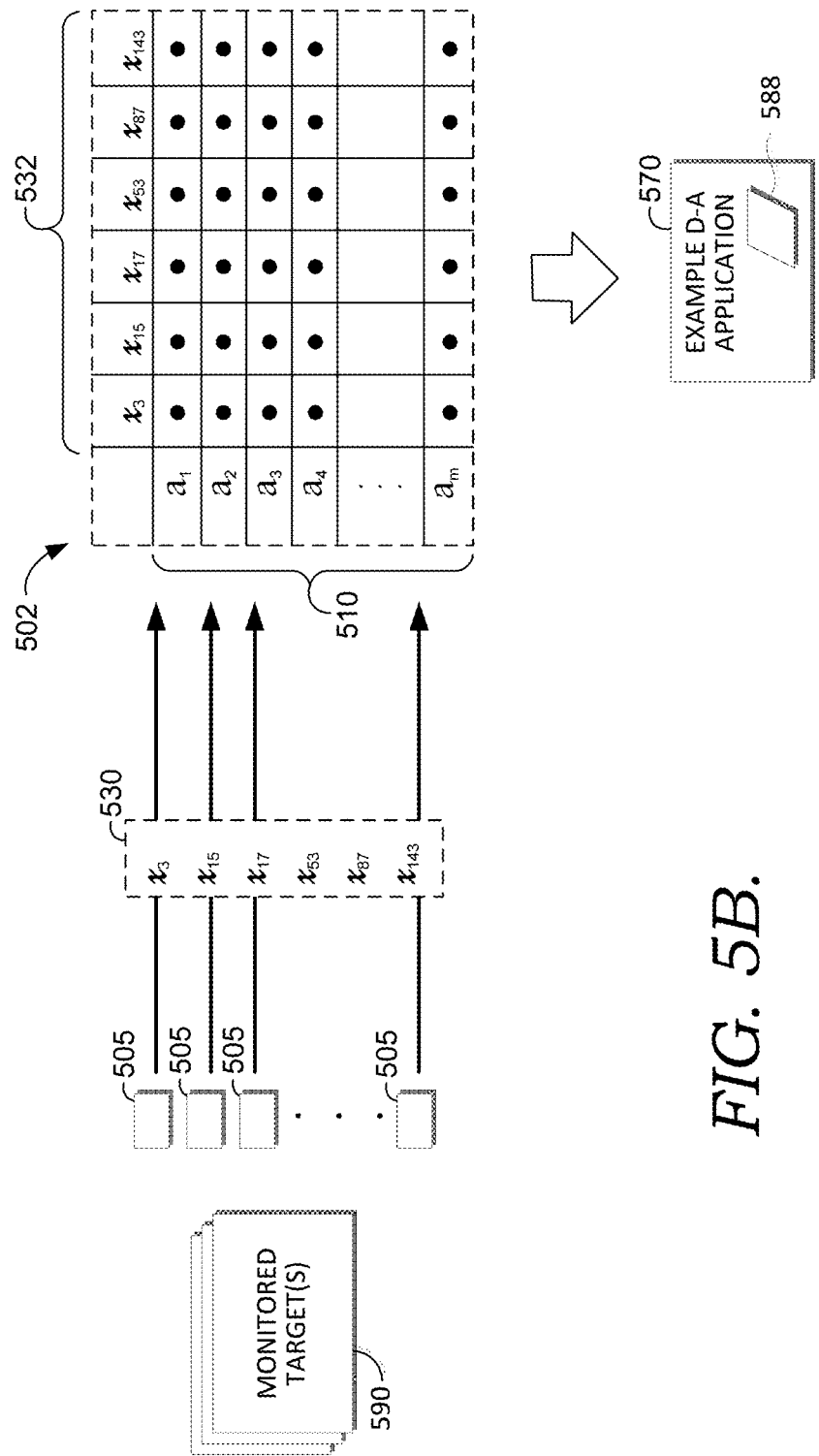

Turning now to FIGS. 5A and 5B, an example is described for utilizing an embodiment of the disclosure (such as described in method 300, 400, or system 200) to determine a set of significant features about a monitored target for use by a data-analytics application. With reference to FIG. 5A, an example matrix 501 is depicted. Example matrix 501 includes n columns of features 520, which may be considered dimensions (or feature dimensions), from $x_1$ to $x_n$, and includes m rows of data 510, from $a_1$ to $a_m$ corresponding to a monitored target or an instance of observation about a monitored target.

In one particular example, each row 510 corresponds to a user, and includes features (columns 520) characterizing the user's activity in regards to a website. Thus, data item 521 comprises one or more data values about user $a_1$ regarding feature $x_n$; for example, if feature $x_n$ indicates a duration of time that a user visited the website, then the value of data item 521 might be ninety seconds. The user activity in this example may be monitored using a sensor or data-collection component embodied as a monitoring process operating on the user's computing device and/or via a script in the website code downloaded to and executed by the computing device. By way of example and not limitation, the initial set of features (columns 520) for this particular example may include 324 features (dimensions, thus n=324) regarding 10,000 users (rows, thus m=10,000), including (as an example): Variable1 (age of user); Variable2 (income of user's household); Variable 3 (user location); Variable4 (applications running); Variable 5 (user device feature); Variable 6 (user device operating system version); etc. In one instance, the significant features determined from this initial set of features may be used as part of a user-response campaign to further engage with the users (website visitors) as described in connection to FIG. 5B.

Continuing with the example, from the initial set of features indicated in column 520, a set of significant features 530 is determined. Specifically, the set of significant features 530 includes six significant features (out of the original 324 features). As shown in item 530, these six significant features include columns 17, 143, 87, 3, 53, and 15 (since the corresponding medoids of the clusters were: $v_{17}$, $v_{143}$, $v_{87}$, $v_3$, $v_{53}$, and $v_{15}$). (Thus the features of these columns are the significant features.) The set of significant features 530 is determined according to an embodiment described herein, such as in connection to system 200 or methods 300 or 400.

With reference to FIG. 5B, an example implementation is depicted using the set of significant features 530 to collect information about a plurality of monitored targets 590, such as users and features characterizing user activity in regards to a website. In one embodiment, a feature filter may be determined based on the set of significant features 530 that specifies which features to observe and gather data for. Thus, sensors 505 correspond to collecting feature data values for the significant features identified by the set of significant features 530. The collected feature data values are depicted in matrix 502, wherein for each user $a_1$ to $a_m$ in rows 510, feature data values are received for features: $x_{17}$, $x_{143}$, $x_{87}$, $x_3$, $x_{53}$, and $x_{15}$ (columns 532). The feature data values for the significant features are utilized by a classifier 588 in a data-analytics application 570, such as a user-response application to further engage with the users (website visitors) by providing content personalized to users, such as via a follow-up communication, as described in connection to data-analytics applications and services 270 in system 200 (FIG. 1).

The set of significant features 530 determined in this example may be evaluated for validation and accuracy. For instance, a first validation means includes performing a comparison of the singular values of the data for the initial feature set (the original 324 features) and those of the data with only the selected five most significant features. The relative error is determined as 7.31% thus the accuracy is 92.69%. Another validation means includes performing a comparison of the first principal component of the data for the initial feature set (the original 324 features) with that of the data from the six significant features. Here, the relative error is determined as 0.0060 or 0.6%. Thus the accuracy is 99.4%. Accordingly, the newly determined set of significant features 530 still provides very accurate information about the user behavior.

Having described various implementations, an exemplary computing environment suitable for implementing embodiments of the disclosure is now described. With reference to FIG. 6, an exemplary computing device is provided and referred to generally as computing device 600. The computing device 600 is but one example of a suitable computing environment and is not intended to suggest any limitation as to the scope of use or functionality of embodiments of the disclosure. Neither should the computing device 600 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. In some implementations, presentation component 220 of system 200 may be embodied as a presentation component 616. Other examples of presentation components may include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Accordingly, we have described various aspects of technology directed to systems and methods for facilitating feature summarization with applications and services using data analytics. It is understood that various aspects, sub-combinations, and modifications of the embodiments described herein are of utility and may be employed in other embodiments without reference to other features or sub-combinations. For example, the order and sequences of steps shown in the example methods 300 and 400 are not meant to limit the scope of the disclosure in any way, and in fact, the steps may occur in a variety of different sequences within some embodiments hereof. Such variations and combinations thereof are also contemplated to be within the scope of embodiments of the disclosure.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method for selecting a set of significant features from an initial set of features and utilizing the set of significant features in a computing application, the method comprising:
    receiving a data matrix comprising data values for each feature from the initial set of features, the initial set of features corresponding to a monitored target;
    generating a plurality of right-singular vectors by applying sparse principle component analysis (sparse PCA) and decomposition to the data matrix, each right-singular vector corresponding to a particular feature in the initial set of features;
    grouping right-singular vectors from the plurality of right-singular vectors into a plurality of clusters;
    for each cluster, determining a right-singular vector at a center of the cluster to identify a set of cluster-center right-singular vectors;

filtering the initial set of features into the set of significant features, the filtering comprising setting the particular features corresponding to the cluster-center right-singular vectors as the set of significant features; and feeding the significant features filtered from the initial set of features to the computing application to provide a prediction, recommendation, inference, or diagnostic about the monitored target, based on data values corresponding to the significant features for the monitored target.

2. The method of claim 1, wherein the monitored target comprises a system, event, user, user interaction with a computing device, transaction, or machine.

3. The method of claim 1, the decomposition further generating a plurality of singular values, wherein the number of clusters included in the plurality of clusters is determined based on a gap in the determined singular values, such that the number of clusters included in the plurality of clusters is equal to the number of highest-value singular values clustered together above the gap.

4. The method of claim 1, further comprising normalizing the data values.

5. The method of claim 1, wherein the decomposition comprises constrained singular value decomposition (SVD), and further comprising using Rank-1 approximation to achieve sparsity of the plurality of right-singular vectors.

6. The method of claim 1, wherein the application includes a classifier and wherein utilizing the significant features in the application comprises generating the classifier based on the significant features and applying the classifier to the data values to provide the prediction, recommendation, inference, or diagnostic about the monitored target.

7. The method of claim 6, wherein the application comprises a content personalization service for a user-response campaign.

8. A computerized system for selecting a set of significant features from an initial set of features and utilizing the set of significant features in a data-analytics computing application, the system comprising:
one or more sensors configured to provide sensor data;
a processor; and
computer memory storing computer-useable instructions that, when used by the processors, cause the processor to perform operations comprising:
receiving, using the one or more sensors, data values for each feature from the initial set of features;
structuring the data values as a first matrix comprising a data matrix with each column of the first matrix corresponding to a particular feature; each particular feature corresponding to a target to be monitored;
generating a plurality of right-singular vectors by applying sparse principle component analysis (sparse PCA) and constrained singular value decomposition (SVD) to the first matrix, each right-singular vector corresponding to a column of the first matrix and thus the particular feature in the initial set of features corresponding to that column;
grouping the right-singular vectors from the plurality of right-singular vectors into a plurality of clusters using k-medoids clustering based on the decomposition;
for each cluster, determining a medoid of the cluster, to identify a set of medoids of the clusters;
filtering the initial set of features into the set of significant features, the filtering comprising setting the particular features corresponding to the right-singular vector of each medoid as the set of significant features;
based on the set of significant features determined from the initial set of features, generating a feature filter specifying the significant features of the target to be monitored; and
applying the feature filter to the data-analytics application to receive and store data values about the target to be monitored, the data values corresponding to the significant features specified in the feature filter.

9. The system of claim 8, wherein applying sparse PCA and constrained SVD further comprises using Rank-1 approximation to achieve sparsity of the plurality of right-singular vectors.

10. The system of claim 8, the constrained SVD further generating a second matrix of singular values, and wherein the number of clusters included in the plurality of clusters is determined based on:

$$\frac{\sum_{i=1}^{r} di}{\sum_{i=1}^{n} di} = w,$$

where n is the number of features in the initial set of features, $d_i$ are the diagonals of the second matrix, and w is a percent of information to be preserved.

11. The system of claim 10, wherein the number of clusters included in the plurality of clusters is further determined based on a parameter associated with the data-analytics application, and wherein w comprises at least ninety percent.

12. The system of claim 8, wherein the target comprises a system, event, user, user interaction with a computing device, transaction, or machine.

13. The system of claim 8, wherein the data-analytics application comprises a content personalization service for a user-response campaign.

14. The system of claim 8, further comprising normalizing the data values.

15. The system of claim 8, further comprising accessing the stored data values and utilizing the data values, by the data-analytics application, to provide a prediction, recommendation, inference, or diagnostic about the target.

16. The system of claim 15, wherein the data-analytics application includes a classifier and wherein utilizing the data values, by the data-analytics application, comprises generating the classifier based on the significant features and applying the classifier to the data values to provide the prediction, recommendation, inference, or diagnostic about the monitored target.

17. A computing device comprising a computer memory and a computer processor that is configured to allow a data-analytics computing application to provide a service associated with a monitored entity, the computing device comprising:
the data-analytics computing application stored on the computer memory having computer instructions configured to:
receive, from at least one sensor in communication with the computing device, information about the monitored entity, the information corresponding to a set of significant features, each feature characterizing an aspect of the monitored entity; and feeding the received information to a classifier component of the data-analytics computing application to determine a prediction, recommendation, inference, or diagnostic about the monitored entity based on the received information about the monitored entity, the classifier determined based on the set of significant features, wherein the set of significant features is determined according to a process comprising:

receiving a data matrix comprising data values for each feature of an initial set of features that includes the set of significant features, the initial set of features corresponding to a target to be monitored;

generating a plurality of right-singular vectors by applying sparse principle component analysis (sparse PCA) and constrained singular value decomposition (SVD) to the data matrix each right-singular vector corresponding to a particular feature in the initial set of features;

grouping the right-singular vectors from the plurality of right-singular vectors into a plurality of clusters based on the decomposition;

for each cluster determining a right-singular vector at the center of the cluster to identify a set of cluster-center right-singular vectors;

filtering the initial set of features into the set of significant features, the filtering comprising setting the particular features corresponding to the cluster-center right-singular vectors as the set of significant features.

18. The computing device of claim 17, wherein the monitored entity comprises an event, a user, or a user interaction with the computing device, and wherein the prediction, recommendation, inference, or diagnostic is provided to the user of the computing device.

19. The computing device of claim 17, wherein the data-analytics application comprises a content personalization service.

20. The computing device of claim 19, wherein the content personalization service comprises an email campaign.

* * * * *